UNITED STATES PATENT OFFICE.

PETER BERGELL, OF BERLIN, GERMANY, ASSIGNOR TO THE FIRM OF JOHAM A. WÜLFING, OF BERLIN, GERMANY.

METHOD OF MAKING MILK FOR INFANTS.

934,133.  Specification of Letters Patent.  Patented Sept. 14, 1909.

No Drawing.  Application filed June 18, 1908.  Serial No. 439,157.

*To all whom it may concern:*

Be it known that I, PETER BERGELL, a subject of the German Emperor, residing at Berlin, Germany, have invented a certain new and useful Improved Method of Making Milk for Infants, of which the following is a specification.

The subject matter of the present invention is an improved method of making milk for infants which has been enriched in lactalbumin.

Heretofore milk for infants has been produced from cow's milk by making additions thereto with an intention of obtaining milk which is similar or equal to human milk. However this has not yet been accomplished regarding the contents of lactalbumin. Cow's milk is considerably poorer in lactalbumin than human milk but it is much richer in casein. The human milk contains about twice or more than twice the percentage of lactalbumin than cow's milk. In order to reduce the large quantity of casein in cow's milk, it has been customary to dilute the same with an equal quantity of water. Hereby the percentage of casein was reduced to about one half but, at the same time, the percentage of lactalbumin was likewise reduced, making its percentage still smaller. It is evident from the above that the enrichment of milk for infants with lactalbumin is an important problem in the production of a wholesome food for infants. This problem has heretofore not been solved although it has repeatedly been attempted to supply the existing difference in lactalbumin by adding other albumins which are apparently similar to the lactalbumin, such as for instance, egg-albumin. In differentiating the albumins, even those which belong to the same group, according to the present state of the knowledge of the art, such additions can no longer be approved. The lactalbumin of the cow's milk only, which is commercially available solely in form of a powder insoluble in water comes into consideration for the desired purpose.

I have discovered that sterile milk for infants which is ready for use and rich in lactalbumin is obtained as follows: The commercial lactalbumin which is insoluble in water is dissolved in sodium hydrate (NaOH), the excess of alkali is removed from the solution thus obtained in any suitable known manner, a process which can be carried out moreover in such manner that the solution is sterilized at the same time. The solution thus obtained is now mixed with milk for infants prepared by adding water and lactose to the cow's milk and, if desired, some cream except that the quantity of water added is not equal to the quantity of the cow's milk but less by a quantity equal to the volume of the lactalbumin solution. Observation shows that the milk character of the liquid is completely preserved when the above method is applied.

In carrying this invention into effect, I substantially proceed as follows: The sterile lactalbumin is dissolved in a sterile solution of sodium hydrate containing 60 gr of sodium hydrate per kgr. of lactalbumin, the excess of the alkali is removed by dialysis or by neutralization with acids, such as hydrochloric or carbonic acid. The neutral sterile solution of lactalbumin thus obtained is added to the milk for infants which has been prepared in the usual manner from cow's milk by adding water, lactose and, if desired, some cream except that the quantity of water added is less than customary and the quantity taken less is equal to the volume of the lactalbumin solution to be added. The addition of the lactalbumin solution may be varied according to the age of the infant in each case corresponding to from 3 to 6 gr of lactalbumin per liter.

I claim as my invention:

1. The method of producing milk for infants similar to human milk, consisting in making a neutral sterile solution of lactalbumin, preparing milk for infants from cow's milk by adding sugar of milk or lactose, and water, and mixing the two solutions together.

2. The method of making milk for infants similar to human milk, consisting in making a neutral sterile solution of lactalbumin, preparing milk for infants from cow's milk by adding cream, sugar of milk or lactose, and water, and mixing the two solutions together.

3. The method of producing milk for infants similar to human milk, consisting in making a neutral sterile solution of lactalbumin, preparing milk for infants from cow's milk by adding sugar of milk or lactose, and a quantity of water less than the quantity of the cow's milk by the volume of the lactalbumin solution and mixing the two solutions together.

4. The method of producing neutral sterile milk for infants containing a percentage of lactalbumin equal to that of the human milk, consisting in dissolving lactalbumin in a sterile solution of sodium hydrate, removing the excess of alkali, preparing separately milk for infants from cow's milk by adding the usual quantities of sugar of milk or lactose, and a quantity of water less than the quantity of the cow's milk by the volume of the lactalbumin solution, and mixing the two solutions together.

5. The method of producing neutral sterile milk for infants containing a percentage of lactalbumin equal to that of the human milk, consisting in dissolving lactalbumin in a sterile solution of sodium hydrate, removing the excess of the alkali by dialysis, preparing separately milk for infants from cow's milk by adding the usual quantities of sugar of milk or lactose, and a quantity of water less than the quantity of the cow's milk by the volume of the lactalbumin solution, and mixing the two solutions together.

In testimony whereof, I affix my signature in the presence of two witnesses.

PETER BERGELL.

Witnesses:
  HENRY HASPER,
  WOLDEMAR HAUPT.